United States Patent [19]
Bourbeau et al.

[11] 3,942,092
[45] Mar. 2, 1976

[54] CYCLOCONVERTER CONTROLLED RECTIFIER PROTECTION CIRCUIT

[75] Inventors: Frank J. Bourbeau; Barton L. Meredith; Arthur L. Witten, all of Santa Barbara, Calif.

[73] Assignee: General Motors Corporation, Detroit, Mich.

[22] Filed: Dec. 16, 1974

[21] Appl. No.: 532,874

[52] U.S. Cl. .................. 321/11; 321/13; 321/66
[51] Int. Cl.² .................. H02M 1/18; H02M 5/30
[58] Field of Search ........ 307/252 N, 252 P, 252 Q, 307/252 T; 317/31; 318/227; 321/11, 12, 13, 60, 61, 65, 66, 69 R

[56] References Cited
UNITED STATES PATENTS

| | | | |
|---|---|---|---|
| 3,539,900 | 11/1970 | Chausse et al. .............. | 321/60 UX |
| 3,681,676 | 8/1972 | Bourbeau .............. | 321/11 |
| 3,852,656 | 12/1974 | Bourbeau .............. | 321/11 |
| 3,882,371 | 5/1975 | Shimer et al. .............. | 321/61 |

*Primary Examiner*—A. D. Pellinen
*Attorney, Agent, or Firm*—Howard N. Conkey

[57] ABSTRACT

In a cycloconverter system, a circuit for maintaining the gate drive signal on the gate of each controlled rectifier when the gate drive command for the controlled rectifier terminates prior to the time when the controlled rectifier would normally become conductive. Voltages across the controlled rectifier are monitored by voltage sensors. Logic circuits are provided which are responsive to the outputs of the voltage sensors and the presence of gate drive commands for maintaining a gate drive signal on the gate of a controlled rectifier when the gate drive command for the controlled rectifier terminates after the controlled rectifier reverse blocks and until it becomes conductive.

3 Claims, 6 Drawing Figures

CYCLOCONVERTER CONTROLLED RECTIFIER PROTECTION CIRCUIT

This invention relates to a protection circuit for cycloconverter controlled rectifiers, and more specifically, this invention relates to a system for preventing the removal of the gate drive signal for a controlled rectifier in a cycloconverter circuit shortly before the controlled rectifier would normally become conductive.

In cycloconverters in which the output frequency is not synchronous with the input frequency, the controlled rectifiers are gated on at random points in the high frequency input cycle thereto. This can give rise to conditions which cause spurious firing of the controlled rectifiers. One such condition is excessive dv/dt stress on the controlled rectifiers when gate current is applied to a controlled rectifier while it is blocking a large positive voltage. A solution to this problem is described in U.S. Pat. No. 3,681,676 which issued Aug. 1, 1972, and is assigned to the assignee of the present invention.

Another condition has been noted which may cause deterioration or destruction of controlled rectifiers in asynchronous cycloconverters. This condition is the removal of controlled rectifier gate current shortly before the controlled rectifier would normally become conductive. Because of the finite fall time of the gate current and because of stored charge in the controlled rectifier gate junction, a controlled rectifier may be rendered conductive on only a small portion of the periphery of the gate structure. The controlled rectifier anode current (determined by the external circuit) then crowds into a small conducting area, causing an elevated junction temperature and possible device failure. It is the general object of this invention to prevent this condition from occurring and thereby prevent possible controlled rectifier failure resulting therefrom.

It is another object of this invention to provide a protection circuit for controlled rectifiers in an asynchronous cycloconverter which prevents removal of a gate drive signal to a controlled rectifier while said controlled rectifier is reverse biased and until the controlled rectifier becomes normally conductive.

It is another object of this invention to provide a protection circuit for controlled rectifiers in an asynchronous cycloconverter wherein the voltage across each of the controlled rectifiers is monitored and the gate drive signal applied thereto is maintained when the gate drive command terminates at a time such that the remaining controlled rectifier reverse blocking time is inadequate to prevent possible controlled rectifier turn-on after the controlled rectifier becomes forward biased.

These and other objects of this invention may be best understood by reference to the following description of a preferred embodiment and the drawings in which.

Figure 1:
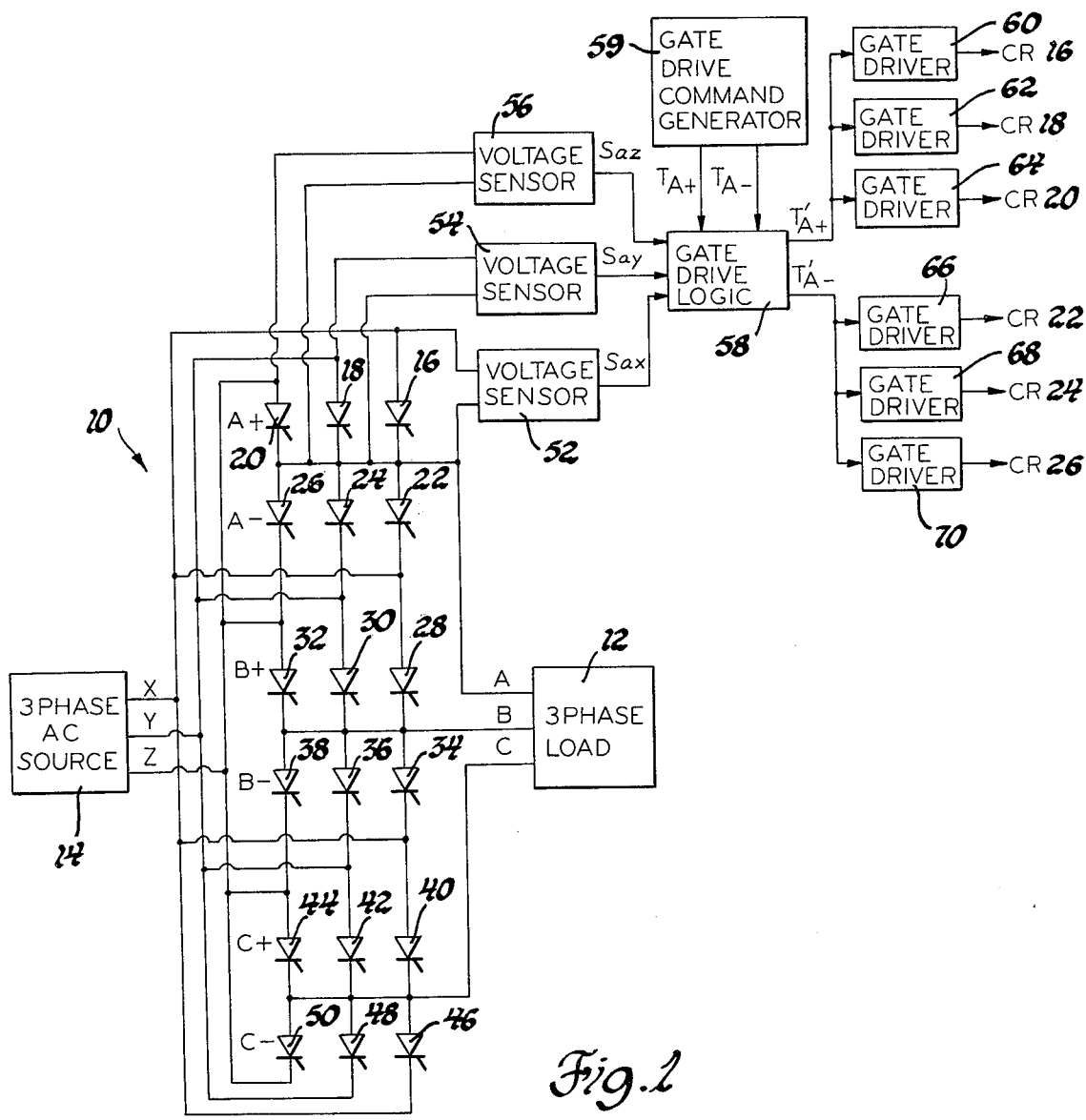
FIG. 1 is a drawing partially in schematic and partially in block form of a cycloconverter and controlled rectifier gate control circuit incorporating the protection circuit of this invention.

Referring to FIG. 1, there is shown a cycloconverter 10 for supplying a three-phase signal having phases A, B and C to a three-phase load 12 from a three-phase AC source 14 having phase outputs X, Y and Z.

The cycloconverter 10 includes groups of controlled rectifiers A+, A−, B+, B−, C+ and C− which are controlled so as to generate the respective phases A, B and C of the three-phase signal supplied to the three-phase load 12. The group A+ is comprised of controlled rectifiers 16, 18 and 20 having their cathodes coupled to the phase A input of the three-phase load 12 and their anodes coupled to the output phases X, Y and Z, respectively, of the three-phase AC source 14. The group A− is comprised of controlled rectifiers 22, 24 and 26 having their anodes coupled to the phase A input of the threephase load 12 and their cathodes coupled to the output phases X, Y and Z, respectively, of the three-phase AC source 14. The group B+ is comprised of controlled rectifiers 28, 30 and 32 having their cathodes coupled to the phase B input of the three-phase load 12 and their anodes coupled to the output phases X, Y and Z, respectively, of the three-phase AC source 14. The group B− is comprised of controlled rectifiers 34, 36 and 38 having their anodes coupled to the phase B input of the three-phase load 12 and their cathodes coupled to the output phases X, Y and Z, respectively of the three-phase AC source 14. The group C+ is comprised of controlled rectifiers 40, 42 and 44 having their cathodes coupled to the phase C input of the three-phase load 12 and their anodes coupled to the output phases X, Y and Z, respectively of the threephase AC source 14. The group C− is comprised of controlled rectifiers 46, 48 and 50 having their anodes coupled to the phase C input of the three-phase load 12 and their cathodes coupled to the output phases X, Y and Z, respectively, of the threephase AC source 14.

Figure 2:
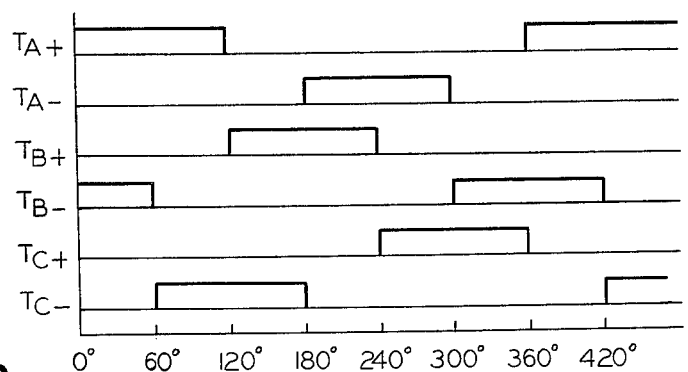
FIG. 2 is a timing diagram illustrating the gate drive commands for the groups of controlled rectifiers in the cycloconverter illustrated in FIG. 1.

The three controlled rectifiers in each group are gated concurrently and the groups A+ through C− are selectively gated conductive so as to generate the three-phase signal for the three-phase load 12 by gate drive signals generated in response to the gate drive commands $T_{A+}$, $T_{A-}$, $T_{B+}$, $T_{B-}$, $T_{C+}$ and $T_{C-}$, respectively, illustrated in the timing diagram of FIG. 2. The gate drive commands of FIG. 2 are generated in any conventional manner and are illustrated as having widths of 120 electrical degrees. It is understood that the widths may vary according to the requirements of the load 12.

If the gate drive signals were to terminate concurrently with the respective gate drive command, a condition may occur whereby a gate drive signal is terminated shortly before the controlled rectifier controlled thereby would normally be conductive. Because of the finite fall time of the gate current and because of stored charge in the controlled rectifier gate junction, the controlled rectifier may be rendered conductive on only a small portion of the periphery of its gate structure. Anode current then may crowd into a small conducting area causing an elevated junction temperature and possible device failure.

To prevent this condition from occurring, the gate drive signals generated in response to the gate drive commands $T_{A+}$ through $T_{C-}$ are not permitted to terminate concurrently with their respective gate drive commands if one of the controlled rectifiers being controlled thereby has inadequate reverse blocking time remaining to insure that the controlled rectifier cannot turn on when forward blocking resumes. The protection circuit for preventing the aforementioned condition from occurring is illustrated in FIG. 1 as applied to controlled rectifier groups $A_+$ and $A_-$, it being understood that an identical system is provided for the remaining groups $B_+$, $B_-$, $C_+$ and $C_-$.

As seen in FIG. 1, the voltages across the controlled rectifiers 16 and 22 are sensed by an absolute magnitude voltage sensor 52 which generates a digital logic signal $S_{ax}$ which is a logic 1 when the magnitude of the voltage sensed exceeds a threshold level below which it can be inferred that one of the controlled rectifiers 16 or 22 is conducting. A single voltage sensor 52 can be used to sense the conduction state of the parallel coupled-oppositely poled controlled rectifiers 16 and 22 since only one of the controlled rectifiers 16 or 22 is commanded to conduct at a time and the gate drive command signals $A+$ and $A-$ indicate which is to conduct.

In like manner, a voltage sensor 54 generates a logic signal $S_{ay}$ which is a logic 1 when the voltage across the controlled rectifiers 18 and 24 exceeds the threshold level and a voltage sensor 56 generates a logic signal $S_{az}$ which is a logic 1 when the voltage across the controlled rectifiers 20 and 26 exceeds the threshold level.

The logic signals $S_{ax}$, $S_{ay}$ and $S_{az}$ are coupled to a gate drive logic 58 which also has coupled thereto the gate drive commands $T_{A+}$ and $T_{A-}$ which are generated by a gate drive command generator 59. The gate drive logic 58 is responsive to the signals applied thereto for generating modified gate drive commands $T'_{A+}$ and $T'_{A-}$.

The modified gate drive commands $T'_{A+}$ and $T'_{A-}$ are each initiated concurrently with the respective gate drive command $T_{A+}$ and $T_{A-}$ but are terminated only when the controlled rectifiers in the respective groups $A+$ and $A-$ are all either conducting or have sufficient reverse blocking time remaining to insure that it cannot turn on when forward blocking resumes. The modified gate drive command $T'_{A+}$ is coupled to gate drivers 60, 62 and 64 which supply gate drive signals concurrent with the modified gate drive command $T'_{A+}$ to the controlled rectifiers 16, 18 and 20, respectively. The modified gate drive command $T'_{A-}$ is coupled to gate drivers 66, 68 and 70 which supply gate drive signals concurrent with the modified gate drive command $T'_{A-}$ to the controlled rectifiers 22, 24 and 26, respectively.

Figure 3:
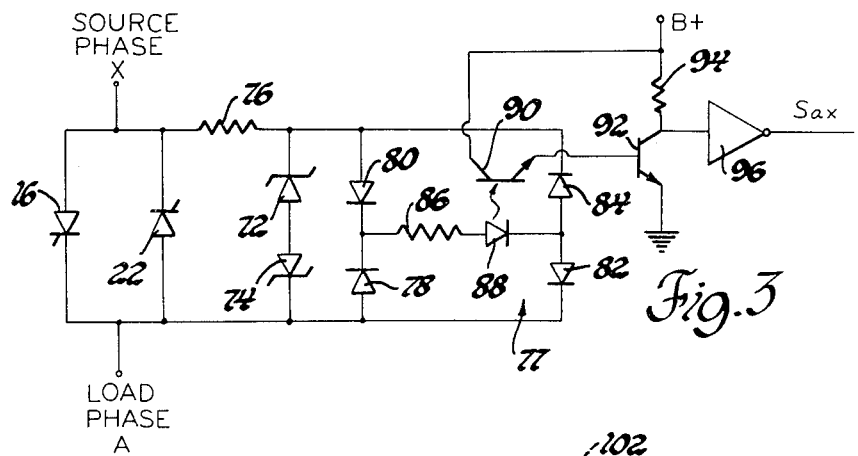
FIG. 3 is a schematic diagram illustrating the voltage sensors shown in block form in FIG. 1.

Referring to FIG. 3, there is illustrated the absolute magnitude voltage sensor 52 for generating the logic signal $S_{ax}$. It is understood that each of the voltage sensors 54 and 56 and the voltage sensors associated with the group $B+$, $B-$, $C+$ and $C-$ are identical thereto.

The voltage across the parallel combination of the controlled rectifiers 16 and 22 are coupled across a voltage limiter comprised of back-to-back series coupled Zener diodes 72 and 74 through a resistor 76. The voltage across the Zener diodes 72 and 74 are coupled across the inputs of a full wave bridge rectifier 77 comprised of diodes 78, 80, 82 and 84. A resistor 86 and a light emitting diode 88 are series coupled across the output of the bridge rectifier 77.

The magnitude of the current through the light emitting diode 88 is a direct function of the magnitude of the voltage across the controlled rectifier 16 and 22 up to the limit imposed by the Zener diodes 72 and 74. The light emitting diode 88 is energized by the current therethrough and emits light which is sensed by a phototransistor 90 having its collector electrode coupled to a voltage source B+ and its emitter electrode coupled to the base electrode of an NPN transistor 92. The collector electrode of the transistor 92 is coupled to the source B+ through a resistor 94 and to an inverter 96. The emitter electrode of the transistor 92 is grounded. The output of the phototransistor 90 is directly proportional to the light output of the light emitting diode 88. When the magnitude of the absolute voltage across the controlled rectifiers 16 and 22 exceeds a threshold level below which it can be inferred that one of the controlled rectifiers 16 or 22 is conducting, the transistor 92 is biased into conduction to ground the input of the inverter 96 which is responsive thereto for generating the logic signal $S_{ax}$ which is a logic 1 when the voltage across the controlled rectifiers 16 and 22 is above the aforementioned threshold level. This logic signal $S_{ax}$ is coupled to the gate drive logic 58 of FIG. 1. In like manner, the logic signals $S_{ay}$ and $S_{az}$, which are responsive to the voltages sensed across the controlled rectifier pairs 18, 24 and 20, 26 are generated and coupled to the gate drive logic 58.

Figure 4:
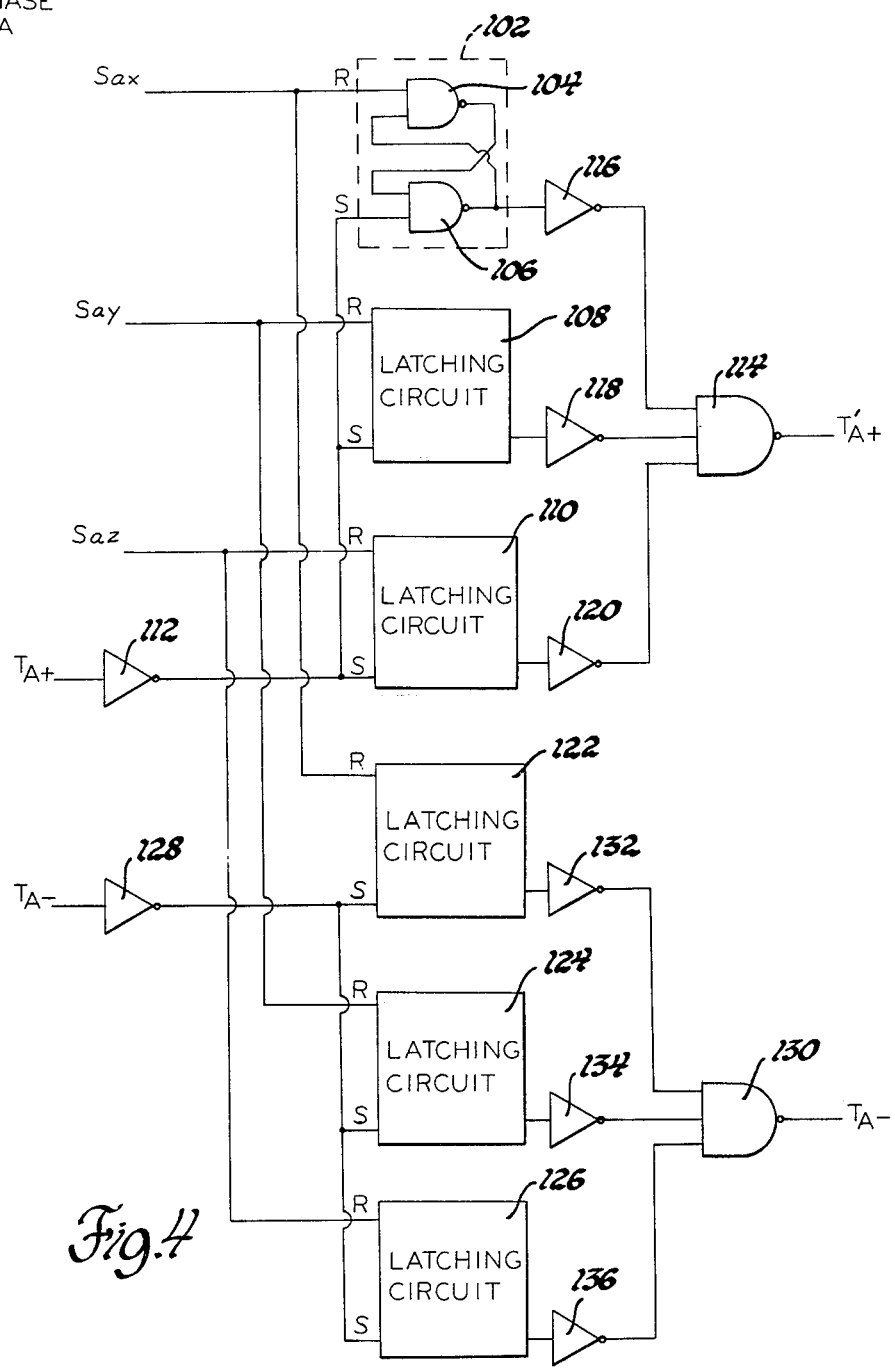
FIG. 4 is a logic circuit illustrating the gate drive logic shown in block form in FIG. 1.

Referring to FIG. 4, there is illustrated the gate drive logic 58 of the FIG. 1 which maintains a gate drive signal on the controlled rectifiers in a group when one of the controlled rectifiers in the group is reverse blocking at the termination of the gate drive command until such time that the controlled rectifier is rendered conductive.

The logic signal $S_{ax}$ representing the conductive state of the controlled rectifier pair 16, 22 is coupled to the reset input of a latching circuit 102 which is comprised of one input of a NAND gate 104. The output of the NAND gate 104 is coupled to one input of a NAND gate 106 whose output constitutes the output of the latching circuit 102. This output is coupled to the second input of the NAND gate 104. The logic signal $S_{ay}$ is coupled to the reset input of a latching circuit 108 which is identical to the latching circuit 102. The logic signal $S_{az}$ is coupled to the reset of a latching circuit 110 also identical to the latching circuit 102. The gate drive command $T_{A+}$ is coupled to the input of an inverter 112 whose output is coupled to the set inputs of the latching circuits 102, 108 and 110.

The output of the latching circuit 102 is coupled to one input of a NAND gate 114 through an inverter 116, the output of the latching circuit 108 is coupled to a second input of the NAND gate 114 through an inverter 118 and the output of the latching circuit 110 is coupled to a third input of the NAND gate 114 through an inverter 120. The output of the NAND gate 114 comprises the modified gate drive command $T'_{A+}$.

The logic signal $S_{ax}$ is further coupled to the reset input of a latching circuit 122, the logic signal $S_{ay}$ is coupled to the reset input of a latching circuit 124 and the logic signal $S_{az}$ is coupled to the reset input of a latching circuit 126.

The gate drive command $T_{A-}$ is coupled to the input of an inverter 128 whose output is coupled to the set inputs of the latching circuits 122, 124 and 126. The output of the latching circuit 122 is coupled to one input of a NAND gate 130 through an inverter 132, the output of the latching circuit 124 is coupled to a second input of the NAND gate 130 through an inverter 134 and the output of the latching circuit 126 is coupled to a third input of the NAND gate 130 through an inverter 136.

Each of the latching circuits 102, 108, 110, 122, 124 and 126 shifts its output from a logic 0 to a logic 1 when its set input shifts to a logic 0 ($T_{A+}$ or $T_{A-}$ shifting to logic 1) and shifts its output from a logic 1 to a logic 0 when its reset input is a logic 0 while its set input is a logic 1. The outputs of the latching circuits 102, 108, 110, 122, 124 and 126 represents the time period the gate drive signals must be applied to the controlled rectifiers 16 through 26 respectively to prevent possible failure thereof as previously described.

The inverters 116, 118 and 120 and the NAND gate 114 function to generate the modified gate drive command $T'_{A+}$ which terminates concurrently with the output of the latching circuit 102, 108 or 110 having the longest duration. In like manner, the inverters 132, 134 and 136 and the NAND gate 130 function to generate the modified gate drive command $T'_{A-}$ which terminates concurrently with the output of the latching circuit 122, 124 or 126 having the longest duration.

It can be seen that the outputs of the latching circuits 102, 108, 110, 122, 124 and 126 may be used if desired to generate respective modified gate drive commands for each of the controlled rectifiers 16 through 26.

The circuit of FIG. 4 functions to extend a drive signal applied to the gate electrodes of the controlled rectifiers in group A+ or to the gate electrodes of the controlled rectifiers in group A− when the respective gate drive command $T_{A+}$ or $T_{A-}$ terminates while one of the controlled rectifiers in the respective group A+ or A− is reverse biased until such time that the controlled rectifier conducts. For example, assume $T_{A+}$ shifts to a logic 1 to effect gating of the controlled rectifiers 16, 18 and 20 in group A+. The output of the inverter 112 then shifts to a logic 0 to set the outputs of the latching circuits 102, 108 and 110 to each to logic 1. The resulting logic 0 inputs to the NAND gate 114 results in the output thereof shifting to a logic 1. This logic 1 signal comprises the modified gate drive command $T'_{A+}$ which is applied to the gate driver circuits 60, 62 and 64 which gate the controlled rectifiers 16, 18 and 20. Upon termination of the gate drive command $T_{A+}$, the set inputs of the latching circuits 102, 108 and 110 each shift to a logic 1. Those latching circuits having reset inputs representing controlled rectifiers which are conducting are immediately reset and the latching circuits having reset inputs remaining at a logic 1 representing a reverse blacking controlled rectifier remain set. Assuming the controlled rectifier 16 reverse blocking upon termination of the drive command $T_{A+}$, the output of the latching circuit 102 remains a logic 1 and the resulting input to the NAND gate 114 at the output of the inverter 116 remains a logic 0. Consequently, the modified gate drive command $T'_{A+}$ continues to be a logic 1 until such time that the controlled rectifier 16 becomes naturally forward conducting as indicated by the logic signal $S_{ax}$ shifting to a logic 0. At that time, the latching circuit 102 is reset and its output shifts to a logic 1. When the controlled rectifiers 16, 18 and 20 which are reverse blocking at time of termination of the gate drive command $T_{A+}$ become conducting, the output of the NAND gate 114 shifts to a logic 0 to terminate the modified gate drive command $T'_{A+}$ and the gate drive signals for the controlled rectifiers 16, 18 and 20 at the output of the gate drivers 60, 62 and 64. In like manner, the gate drive for the controlled rectifiers 22, 24 and 26 are extended by operation of the latching circuits 122, 124 and 126 in the same manner as described with reference to the controlled rectifiers 16, 18 and 20.

Figure 5:
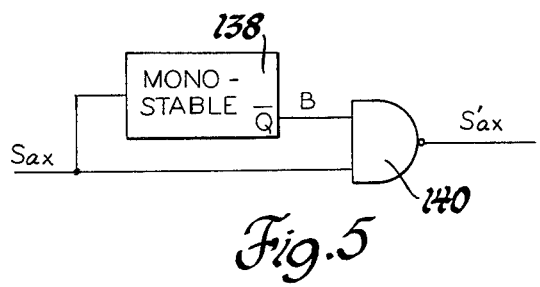
FIG. 5 is a drawing of a blanking circuit which may be included in the logic circuit of FIG. 4.

The logic circuit illustrated in FIG. 4 extends at random the gate drive signals from the gate drivers for a period from zero up to the reverse blocking period of the controlled rectifiers. This maximum extension is approximately two-thirds of the period of the output waveform of the three-phase AC source 14. For a ratio, R, of the output frequency of the three-phase source 14 and the three-phase input to the load 12, the maximum extension is two-thirds R of the period of the input to the load 12. It is apparent that the maximum extension may be excessive for ratios of, say, R less than eight. In order to decrease the maximum extension of the gate drive signal, the leading edge of the logic signal $S_{ax}$ may be blanked for a specified time period so as to prevent extension of the gate drive signal when the gate drive command terminates early in the controlled rectifier reverse blocking period where adequate reverse blocking time remains to insure that the controlled rectifier turn on cannot occur when forward blocking resumes. This is accomplished by the circuit of FIG. 5 with respect to the controlled rectifiers 16 and 22, it being understood that identical circuits are provided for the remaining controlled rectifiers. As seen in FIG. 5, the logic signal $S_{ax}$ is coupled to the input of a monostable multivibrator 138 instead of to the latching circuits 102 and 122 and to one input of a NAND gate 140. The leading edge of the logic signal $S_{ax}$ triggers the multivibrator 138 whose Q output is a blanking signal B coupled to a second input of the NAND gate 140. The multivibrator 138 and the NAND gate 140 function to delay the leading edge of the logic signal $S_{ax}$ for the time period of the blanking signal B. The output of the NAND gate 140 is a logic signal $S'_{ax}$ representing the blanked logic signal $S_{ax}$. The logic signal $S'_{ax}$ is coupled to the reset input of the latching circuits 102 and 122. The duration of the blanking of the logic signal $S_{ax}$ is selected so that at the highest cycloconverter output frequency the blanked logic signal $S'_{ax}$ has sufficient duration to insure against a weak gate turn on of the controlled rectifiers 16 and 22.

Figure 6:
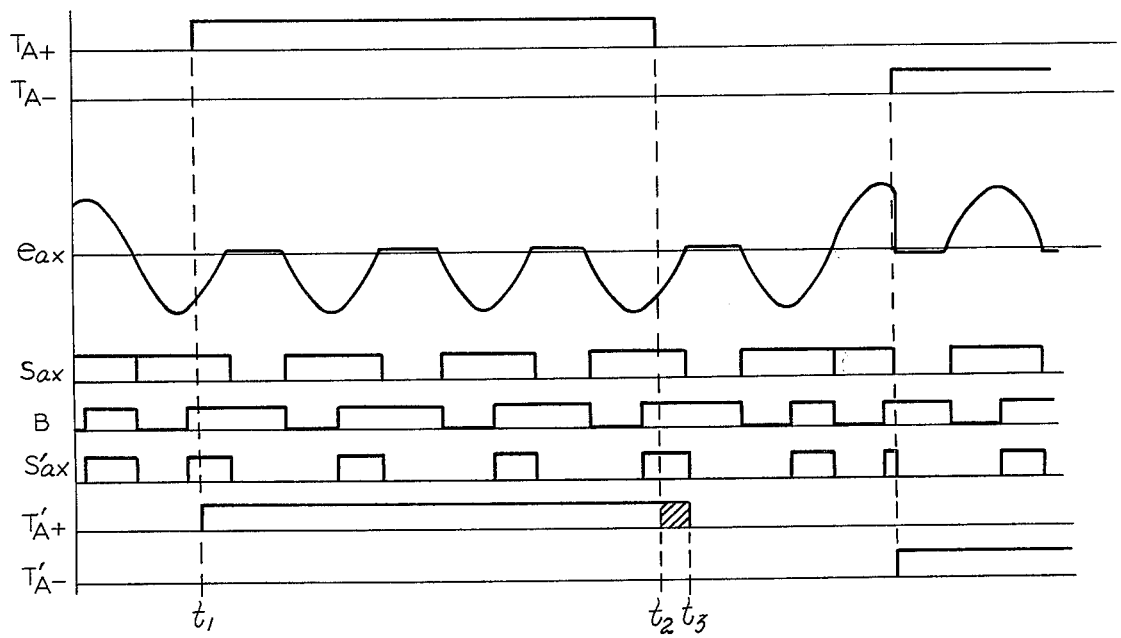
FIG. 6 illustrates the voltage and logic wave forms developed in the system illustrated in FIG. 1.

The resulting waveforms are illustrated in FIG. 6, wherein at time $t_1$, the gate drive command $T_{A+}$ shifts to a logic 1 resulting in the shifting of the outputs of the latching circuits 102, 108 and 110 to a logic 1. The output of the NAND gate 114 of FIG. 4 then shifts to a logic 1 to thereby generate the logic signal $T'_{A+}$. The gate drivers 60, 62 and 64 of FIG. 1 each generate a gate drive signal in response to the logic signal $T_{A+}$ which is coupled to the gate electrodes of the controlled rectifiers 16, 18 and 20, respectively. Each time the voltage $e_{ax}$ across the controlled rectifier 16 represents reverse blocking, the logic signal $S_{ax}$ shifts to a logic 1 for the duration thereof. Upon generation of the logic $S_{ax}$, the blanking signal B at the output of the monostable multivibrator 138 shifts to a logic 0. The output of the NAND gate 140 remains a logic 0 until the termination of the blanking signal B after which the output shifts to a logic 1. This signal $S'_{ax}$ is coupled to the reset input of the NAND gate 102. At time $t_2$, the gate drive command $T_{A+}$ terminates while the controlled rectifier 16 is reversed blocking and after the controlled rectifier 16 had been reversed blocking for a period greater than the duration of the blanking pulse B at the output of the monostable multivibrator 138. Consequently, the latching circuit 102 remains set to maintain the modified gate drive command $T'_{A+}$ until time $t_3$, at which time the controlled rectifier 16 becomes conducting and the logic signal $S_{ax}$ shifts to a logic 0. The latching circuit 102 is reset thereby and the modified gate drive command $T'_{A+}$ shifts to a logic 0 to terminate the gate drive signals to the controlled rectifiers 16, 18 and 20.

In the circuit described, the drive signals for the controlled rectifiers in each group has a duration equal to that of the longest required drive signal of the controlled rectifiers in that group. If desired, the outputs of the respective latching circuits such as the latching circuits in FIG. 4, may be used to generate respective gate drive signals for each individual controlled rectifier. Further, the invention has been described with reference to an eighteen controlled rectifier cycloconverter but has application to cycloconverters having lesser or greater number of controlled rectifiers.

The detailed description of the preferred embodiment of this invention for the purpose of explaining the principles thereof, is not to be considered as limiting or restricting the invention since many modifications may be made by the exercise of skill in the art without departing from the scope of the invention.

We claim:

1. A gate drive circuit for a respective controlled rectifier in a cycloconverter system comprising: means for generating a gate drive command for the controlled rectifier; a voltage sensor coupled across the controlled rectifier for generating a signal representing the conduction state of the controlled rectifier; logic means having first and second inputs and first and second output states; means coupling the gate drive command to the first input; means coupling the signal representing the conduction state of the controlled rectifier to the second input, the logic means shifting its output from the first state to the second state in response to the gate drive command coupled to its first input and shifting its output from the second state to the first state in response to the signal coupled to its second input when said signal represents nonconduction of the controlled rectifier after termination of the gate drive command at its first input; means coupled to the logic means for generating a gate drive signal when the output of the logic means is in the second state; and means coupling the gate drive signal to the gate of the controlled rectifier, whereby gate drive signal is extended after termination of the gate drive command until the controlled rectifier becomes conductive to prevent turn-on of the controlled rectifier when it becomes forward blocking following termination of the gate drive signal.

2. A gate drive circuit for a respective controlled rectifier in a cycloconverter system comprising: means for generating a gate drive command for the controlled rectifier; a voltage sensor coupled across the controlled rectifier for generating a first digital signal when the controlled rectifier is reversed blocking; means for blanking the leading edge of the digital signal for a specified time duration and generating a second digital signal having a duration equal to the remaining portion of the first digital signal; logic means having first and second inputs and first and second outut states; means coupling the gate drive command to the first input; means coupling the second digital signal to the second input, the logic means shifting its output from the first state to the second state in response to the gate drive command coupled to its first input and shifting its output from the second state to the first state in response to the absence of the second digital signal following termination of the gate drive command to the first input; means coupled to the logic means for generating a gate drive signal when the output of the logic means is in the second state; and means coupling the gate drive signal to the gate of the controlled rectifier, whereby the gate drive signal to the gate electrode of the controlled rectifier is extended after termination of the gate drive command until the controlled rectifier becomes conductive when the time remaining until the controlled rectifier normally becomes conductive following termination of the gate drive command is equal to or less than the duration of the second digital signal.

3. A cycloconverter system comprising: a polyphase alternating current source; a load; first and second groups of controlled rectifiers, each controlled rectifier of the first group being coupled between a respective one of the phase outputs of the polyphase source and the load and being poled for supplying positive current to said load and each controlled rectifier of the second group being coupled between the respective one of the phase outputs of the polyphase source and the load and being poled for supplying negative current to said load; a respective absolute value voltage sensor for each pair of controlled rectifiers in the first and second groups which are coupled to one of the phase outputs of the polyphase source, each of said absolute value sensors being coupled across the respective pair of controlled rectifiers and generating a digital signal representing the reverse blocking period of said respective pair of controlled rectifiers; means for generating alternating first and second gate drive commands for the first and second groups of controlled rectifiers respectively; a respective logic means for each controlled rectifier in the first and second groups, each of said logic means having first and second inputs and first and second output states; means coupling the first gate drive command to the first input of each of the logic means for the controlled rectifiers in the first group; means coupling the second gate drive command to the first input of each of the logic means for the controlled rectifiers in the second group; means coupling each of the digital signals to the second input of the logic means for said controlled rectifier whose reverse blocking period is represented thereby, each logic means shifting its output from the first state to the second state in response to the gate drive command coupled to the first input and shifting its output from the second state to the first state in response to the absence of the digital signal coupled to its second input following termination of the gate drive command coupled to its first input; means responsive to the output of the logic means for the controlled rectifiers in the first group for generating a first gate drive signal for the controlled rectifiers in the first group, said first gate drive signal having a duration coexistent with the second state output of the logic means for the controlled rectifiers in the first group having the longest time duration; means responsive to the output of the logic means for the controlled rectifiers in the second group for generating a second gate drive signal for the controlled rectifiers in the second group, said second gate drive signal having a duration coexistent with the second state output of the logic means for the controlled rectifiers in the second group having the longest time duration; and means coupling the first and second gate drive signals to the controlled rectifiers in the first and second groups, respectively, whereby the gate drive signals to the controlled rectifiers in each group is extended after termination of the respective gate drive command therefor when one of the controlled rectifiers in said group is reverse blocking when the gate drive command terminates until said controlled rectifier becomes conductive.

* * * * *